US011379843B2

(12) United States Patent
Saka et al.

(10) Patent No.: US 11,379,843 B2
(45) Date of Patent: Jul. 5, 2022

(54) SYSTEMS AND METHODS FOR MULTI-DOMAIN APPLICATION HOSTING PLATFORM MIGRATION

(71) Applicant: PAYPAL, INC., San Jose, CA (US)

(72) Inventors: Veera Saka, Andhra Pradesh (IN); Somu Arunachalam, Chennai (IN); Krupa Sriram, Sengodampalayam (IN); Aswanth Kumar Latchipatruni, Viziangaram (IN)

(73) Assignee: PayPal, Inc., San Jose, CA (US)

( * ) Notice: Subject to any disclaimer, the term of this patent is extended or adjusted under 35 U.S.C. 154(b) by 129 days.

(21) Appl. No.: 16/879,448

(22) Filed: May 20, 2020

(65) Prior Publication Data

US 2021/0304205 A1 Sep. 30, 2021

(51) Int. Cl.
*G06Q 40/00* (2012.01)
*G06Q 20/40* (2012.01)
(Continued)

(52) U.S. Cl.
CPC ......... *G06Q 20/4016* (2013.01); *G06F 9/466* (2013.01); *G06Q 20/10* (2013.01); *G06Q 20/405* (2013.01)

(58) Field of Classification Search
CPC .. G06Q 20/4016; G06Q 20/10; G06Q 20/405; G06F 9/466
See application file for complete search history.

(56) References Cited

U.S. PATENT DOCUMENTS 10,311,030 B1 * 6/2019 Barnes ................. G06F 16/214
2005/0209957 A1 9/2005 Kasiviswanathan et al.
(Continued)

FOREIGN PATENT DOCUMENTS

WO WO-2009111799 A2 * 9/2009 ........... G06F 9/4856
WO WO-2011000323 A1 * 1/2011 ............. G06F 21/57

OTHER PUBLICATIONS

Zhang et al., "A Black-Box Strategy to Migrate GUI-based Legacy Systems to Web Services," 2008 IEEE International Symposium on Service-Oriented System Engineering, 2008 (Year: 2008).*
(Continued)

*Primary Examiner* — Alexander G Kalinowski
*Assistant Examiner* — William B. Bunker
(74) *Attorney, Agent, or Firm* — Haynes and Boone, LLP (57) ABSTRACT

Methods and systems are presented for facilitating migration from a first hosting platform that hosts a first set of transaction processing systems to a second hosting platform. A second set of transaction processing systems that corresponds to the first set of transaction processing systems is deployed in the second hosting platform. As incoming transaction requests that are intended for the first set of transaction processing systems are detected, corresponding transaction requests are generated based on the incoming transaction requests and a correlation table. The corresponding transaction requests are sent to the second set of transaction processing systems for processing. Corresponding responses from the first set of transaction processing systems and the second set of transaction processing systems are obtained and compared against each other. A functionality of the second hosting platform can be validated based on the comparing.

20 Claims, 5 Drawing Sheets

(51) Int. Cl.
*G06Q 20/10* (2012.01)
*G06F 9/46* (2006.01)

(56) References Cited

U.S. PATENT DOCUMENTS

| | | | |
|---|---|---|---|
| 2006/0004865 A1 | 1/2006 | Theurer | |
| 2007/0011209 A1* | 1/2007 | Wietlisbach | G06F 16/214 |
| 2008/0301136 A1* | 12/2008 | De Pauw | G06F 16/36 |
| | | | 707/E17.042 |
| 2011/0099548 A1* | 4/2011 | Shen | G06F 9/45558 |
| | | | 718/1 |
| 2011/0179111 A1 | 7/2011 | Ravichandran et al. | |
| 2011/0179150 A1* | 7/2011 | Ravichandran | H04L 69/329 |
| | | | 709/221 |
| 2011/0276675 A1* | 11/2011 | Singh | G06F 9/4856 |
| | | | 709/223 |
| 2012/0221845 A1* | 8/2012 | Ferris | H04L 67/1097 |
| | | | 713/150 |
| 2013/0091285 A1* | 4/2013 | Devarakonda | G06F 9/5072 |
| | | | 709/226 |
| 2013/0326275 A1 | 12/2013 | Gururaj et al. | |
| 2014/0215033 A1 | 7/2014 | Ravichandran et al. | |
| 2015/0261842 A1* | 9/2015 | Huang | G06F 16/284 |
| | | | 707/758 |
| 2015/0264128 A1* | 9/2015 | Huang | H04L 67/1006 |
| | | | 709/203 |
| 2015/0304243 A1* | 10/2015 | Jasperson, Jr | H04L 67/306 |
| | | | 709/225 |
| 2016/0110232 A1* | 4/2016 | Clissold | G06F 9/466 |
| | | | 719/320 |
| 2017/0373935 A1* | 12/2017 | Subramanian | G06F 9/5072 |
| 2019/0065351 A1* | 2/2019 | Rakhmilevich | G06F 9/4856 |

OTHER PUBLICATIONS

Kooijimans et al., "Considerations for Transitioning Highly Available Applications to System z," ibm.com/redbooks, 2011 (Year: 2011).*

International Application No. PCT/US2021/020466, International Search Report and Written Opinion dated May 21, 2021, 18 pages.

Kallman R., et al., "H-Store: A High-Performance, Distributed Main Memory Transaction Processing System", Proceedings of the VLDB Endowment 1.2 (2008): 1496-1499, Aug. 28, 2008, Retrieved on Apr. 27, 2021, Retrieved from Internet URL: https://dl.acm.org/doi/abs/10.14778/1454159.1454211, 5 pages.

* cited by examiner

SYSTEMS AND METHODS FOR MULTI-DOMAIN APPLICATION HOSTING PLATFORM MIGRATION

CROSS REFERENCE TO RELATED APPLICATION

This application claims priority to India Provisional Patent Application No. 202041014276, filed Mar. 31, 2020, which is incorporated herein by reference in its entirety.

TECHNICAL FIELD

The present specification generally relates to migrations of software application hosting platforms, and more specifically, to validating a hosting platform in performing functionalities associated with different domains during a migration process, according to various embodiments of the disclosure.

BACKGROUND

Online service providers, such as online merchants, online content providers, online banks, etc., provide a variety of services over a network (e.g., the Internet). An online service provider typically has, uses, or manages one or more software applications for performing different functionalities associated with their online services. For example, an online merchant may use computer software code associated with a set of user interfaces (e.g., webpages) for presenting content to users and software applications for performing back-end processes such as facilitating a purchase transaction, generating the content for display on the webpages, etc. An online bank may use computer software code associated with a set of user interfaces for interacting with their customers and software applications for performing back-end processes such as performing a fund transfer transaction, performing a payment transaction, performing a refund transaction, authenticating users, etc.

In addition to the software applications, the online service provider also needs a hosting platform within which the software code and the software applications are deployed. The hosting platform may include the necessary hardware and software that enables the software applications of the online service provider to provide online services to user devices over a network. For example, the hosting platform may include a data storage device for storing data associated with the online services (e.g., user account data, transaction data, etc.), hardware and/or software infrastructure for running the software applications, such as one or more computing devices that executes the software applications, an operating system, etc., hardware and/or software infrastructure for providing networking capability for the software applications, such as ports, cables that couple the computing devices to the network, a firewall for protecting the software applications, a web server for serving the webpages to user devices, etc.

The hosting platform may be maintained by the service provider, or by a third-party entity (e.g., Google Cloud Platform, Amazon Web Services, etc.). For reasons such as cost, an expansion of the service provider, reliability, and other reasons, an online service provider may desire to change (e.g., migrate) from an existing hosting platform to a new hosting platform. Migrating from a hosting platform to another hosting platform is an enormous task for a service provider, as many components within the new hosting platform may not work properly or may be incompatible with the software applications associated with the service provider. As the service provider does not want any interruptions and/or degradation of their services during and/or after the migration, the service provider may desire to address any potential issue before fully migrating to the new hosting platform. However, it is challenging to foresee all potential issues (e.g., defects, bugs, etc.) before the migration actually occurs. Thus, there is a need for providing a mechanism to analyze and validate the functionality of a new hosting platform by comparing the performance of the new hosting platform against the performance of the current hosting platform.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for facilitating migration from a current hosting platform (e.g., a first hosting platform) to a new hosting platform (e.g., a second hosting platform) for hosting transaction processing systems configured to process transactions in multiple domains for an online service provider. The online service provider may provide a variety of services to its users. For example, an online payment service provider may provide to its users online services in different domains, such as electronic payment processing, disputes processing, account management, online purchases, payout services, onboarding, funding source management services, etc. The online service provider may include different transaction processing systems, where each of the transaction processing systems may be configured to provide services in a particular domain. Thus, each of the transaction processing systems may include one or more software applications and associated data configured to perform services in the corresponding domain for users. The online service provider may use a single hosting platform (e.g., the first hosting platform) to host many or all of the transaction processing systems. For reasons such as cost, reliability, scalability or other reasons, the online service provider may desire to migrate from the first hosting platform to the second hosting platform.

As discussed above, migrating from one hosting platform to another hosting platform can be an enormous task for an online service provider, as each of the hosting platforms may include many components. It can be a challenging task to verify that all of the components in the second hosting platform are working properly and are compatible with the software applications of the online service provider.

According to various embodiments of the disclosure, a platform testing system may be configured to test and validate the functionalities of the second hosting platform by shadow testing the second hosting platform over a period of time. To conduct shadow testing on the second hosting platform, the platform testing system may first determine a set of transaction processing systems that are running on the first hosting platform, and deploy the set of transaction processing systems on the second hosting platform. In some embodiments, deploying the set of transaction processing systems on the second hosting platform includes compiling and executing software applications associated with the set of transaction processing systems on a set of computing devices associated with the second hosting platform and storing the data associated with the set of transaction processing system in one or more data storage devices of the second hosting platform.

The platform testing system may then monitor (or intercept) incoming traffic for the set of transaction processing systems running on the first hosting platform. The incoming traffic may include different transaction requests generated and transmitted by user devices associated with users of the online service provider. For at least a portion (or all) of the incoming requests transmitted to the first hosting platform, the platform testing system may generate corresponding transaction requests for the second hosting platform. In some embodiments, the platform testing system may simply duplicate the transaction requests that were transmitted to the first hosting platform. However, in many instances, simply duplicating the transaction request may lead to incorrect processing of transaction and corruption of data. For instance, when a first transaction request is for creating a new user account with the online service provider, the platform testing system may copy the first transaction request and transmit the copy of the first transaction request to the second hosting platform. While the transaction requests that are transmitted to the first and second hosting platforms may be identical, the result may not be identical. For example, the transaction processing systems for creating a user account (e.g., onboarding) running on the two hosting platforms may use a specific algorithm for generating an account identifier for the user account. The algorithm may be dependent on variables that are different when the first transaction request is being processed by the transaction processing systems running on the different hosting platforms (e.g., a timestamp, a device ID associated with the computing device running the transaction processing system, etc.). As such, the new accounts generated by the transaction processing systems running on the two hosting platforms may have different account identifiers even when they are based on the same transaction request.

When a second transaction request for performing a different process (e.g., making an electronic payment request) for that user account is received by the first hosting platform, the platform testing system cannot duplicate the second transaction request for the second hosting platform, as the second transaction request includes an account identifier that does not correlate to the user account that was created in the second hosting platform based on the first transaction request. Thus, in some embodiments, the platform testing system may include a correlation table that maps data associated with the first hosting platform to data associated with the second hosting platform.

When an incoming request for the first hosting platform is intercepted, the platform testing system may determine whether a modification needs to be done to the request based on the correlation table. For example, if an account identifier in the incoming request is included in the correlation table, the platform testing system may generate a corresponding request using a different account identifier indicated in the correlation table for the second hosting platform. The platform testing system may then transmit the generated request to the second hosting platform for processing. To ensure that the data across the two hosting platforms are synchronized, the platform testing system may, at different times (e.g., periodically, etc.), flash the database of the second hosting platforms with data from the first hosting platforms. For example, the platform testing system may erase all existing data in the data storage devices of the second hosting platform (including account data and the correlation table) and copy all of the data from the first hosting platform to the second hosting platform.

As each incoming request is transmitted to the first hosting platform and a corresponding request generated by the platform testing system is transmitted to the second hosting platform for processing, the platform testing system may monitor and obtain responses from both of the first and second hosting platforms. Each of the responses may include values corresponding to a set of attributes. For example, a response may include a status of processing the transaction request (e.g., approved, denied, rejected, etc.), a timestamp associated with the transaction, an identifier of the corresponding transaction, an account identifier associated with the transaction request, an amount associated with the transaction request (e.g., when the transaction request is a payment transaction), and other data. The platform testing system may compare the responses from the first and second hosting platforms to determine whether they match or whether a difference between the responses from the two hosting platforms satisfies a set of criteria.

In some embodiments, the set of criteria sets forth which of the attributes are required to match between the two responses (e.g., critical attributes), which of the attributes can be different between the two responses (e.g., non-critical attributes), and what are the acceptable differences. For example, the set of criteria may specify that the status attribute is a critical attribute and that the statuses from the two responses must match, but the timestamp attribute is a non-critical attribute and the timestamps from the two responses may be different by a predetermined amount. Furthermore, the set of criteria may specify that the account identifier attributes between the two responses may be different as long as they correlate with each other in the correlation table.

Since each of the transaction processing systems (corresponding to the different domains of the online service provider) may be implemented differently (by different software application programmers), the set of criteria for determining whether a response from the second hosting platform is acceptable may be different for each transaction processing system as well. In addition, since which attribute (s) can be different and how they can be different in the corresponding responses may be unique to each transaction processing system, domain knowledge of each of the different domains may be required to determine the criteria for the corresponding domain. In some embodiments, the platform testing system may obtain inputs from domain experts (e.g., the software application programmers) of each domain to generate the set of criteria. Based on the obtained inputs corresponding to each domain, the platform testing system may generate a set of criteria that specifies which subset of the attributes are critical attributes (e.g., the values must match in the responses), which subset of the attributes are non-critical attributes (e.g., the values can be different in the responses), and what are the acceptable differences.

For example, a domain expert corresponding to the onboarding domain may indicate that the account identifier attribute associated with the newly created account in the responses may be different, but that the status attribute must match. Furthermore, the domain expert may also indicate which attribute(s) (e.g., the account identifier attribute) needs to be added to the correlation table. Thus, based on the obtained input, the platform testing system may generate a set of criteria for the onboarding domain, which specifies a list of attributes, including the account identifier attribute, for matching between responses from the two hosting platforms. However, obtaining the inputs from the different domain experts can be challenging, especially when the number of different domains is large.

Thus, according to various embodiments of the disclosure, the platform testing system may automatically determine the set of criteria for each domain of the online service provider by analyzing historic responses associated with to the domain from the first and second hosting platforms. For example, as the platform testing system begins performing shadow testing on the second hosting platform, the platform testing system may monitor the corresponding responses obtained from the corresponding transaction processing systems in the first and second hosting platforms and analyze the attribute values from the responses. The platform testing system may determine attributes that consistently match between corresponding responses from the first and second hosting platforms and attributes that are consistently different between corresponding responses from the first and second attributes. The platform testing system may then generate the set of criteria (indicating which attributes are critical attributes and which attributes are non-critical attributes) based on the monitoring of the responses. In some embodiments, the platform testing system may also provide a user interface that enables users (e.g., domain experts, etc.) to modify the set of criteria after it has been automatically determined based on the monitoring of historic responses.

Once the set(s) of criteria corresponding to the different domains have been generated, the platform testing system may begin testing the second hosting platform by comparing new responses obtained from the first and second hosting platforms. For example, when a new incoming transaction request intended for the first hosting platform is intercepted, the platform testing system may generate a corresponding transaction request for the second hosting platform, and may obtain responses from the first and second hosting platform based on processing the transaction requests. The platform testing system may select, from the different sets of criteria, a particular set of criteria based on the domain (or the transaction processing system) associated with the transaction request. If the platform testing system determines that the two responses (from the two hosting platforms) satisfy the particular set of criteria, the platform testing system may continue to transmit corresponding transaction requests to the first and second hosting systems and monitor the responses. However, if the platform testing system determines that the two responses do not satisfy the particular set of criteria (e.g., the difference between the two responses does not satisfy the set of criteria), the platform testing system may determine that there is an issue with the second hosting platform.

Thus, the platform testing system may perform shadow testing on the second hosting platform by intercepting incoming transaction requests intended for the first hosting platform, generating corresponding transaction requests based on the incoming transaction requests, and comparing responses from the first and second hosting platforms. The platform testing system may perform shadow testing on the second hosting platform for a period of time (e.g., 5 hours, 1 day, 30 days, etc.) and may validate one or more functionalities of the second hosting platform based on the shadow testing. For example, the platform testing system may validate a first functionality (e.g., electronic payment transaction) of the second hosting platform when the number of transaction requests associated with the first functionality (e.g., electronic payment transaction requests) have been shadow tested on the second hosting platform, where all of them satisfies the set of criteria. In some embodiments, the platform testing system may generate a report indicating which of the functionalities that have been validated through the shadow testing, and may provide the report to a device associated with the online service provider.

Figure 1:
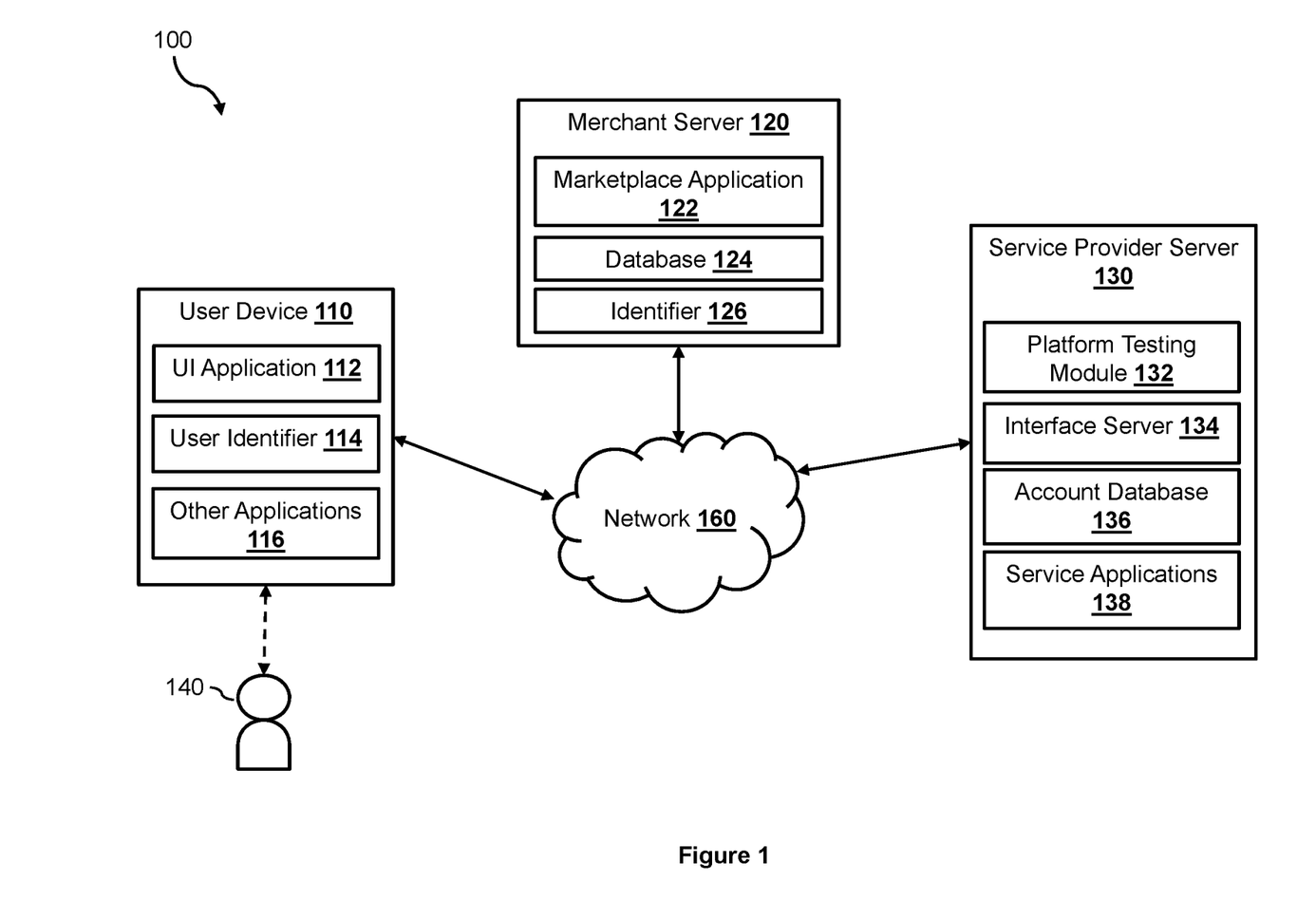
FIG. 1 is a block diagram illustrating an electronic transaction system according to an embodiment of the present disclosure.

FIG. 1 illustrates an electronic transaction system 100 within which the platform testing system may be implemented according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via a website hosted by the merchant server 120 or a point-of-sale (POS) system associated with the merchant server 120 through one or more software applications associated with the service provider server 130 and/or the merchant server 120. The user 140 may also log in to a user account to access account services or conduct electronic transactions (e.g., payment transactions, fund transfer transaction, adding a funding source transaction, onboarding transactions, dispute transactions, etc.) with the service provider server 130. Similarly, a merchant associated with the merchant server 120 may use the merchant server 120 to log in to a merchant account to conduct electronic transactions (e.g., payment transactions, onboarding transactions, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface application 112 (e.g., a web browser, a mobile application, etc.), which may be utilized by the user 140 to conduct electronic transactions (e.g., online payment transactions, etc.) with the service provider server 130 over the network 160. In one implementation, the user interface application 112 includes a proprietary software program (e.g., a mobile application) that provides a graphical user interface (GUI) for the user 140 to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may be one of the device attributes requested by the webpages. Thus, when executing the one or more functions based on the API calls, the user interface application 112 may retrieve the device identifier (e.g., from the registry of the user device 110, from the operating system running on the user device 110, etc.) and provide the device identifier to the webpages.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. The merchant may also have an account with the service provider server 130. Even though only one merchant server 120 is shown in FIG. 1, it has been contemplated that one or more merchant servers (each similar to merchant server 120) may be communicatively coupled with the service provider server 130 and the user device 110 via the network 160 in the system 100.

The service provider server 130, in one embodiment, may be maintained by a transaction processing entity such as an online service provider, which may provide electronic transaction services for the user 140 of user device 110 and one or more merchants. As such, the service provider server 130 may include one or more service applications 138 (also referred to as transaction processing systems) to facilitate different electronic transaction services offered by the service provider server 130. In some embodiments, each of the service applications 138 may correspond to a different domain of the service provider server 130. For example, one of the service applications 138 may be configured to process onboarding transaction requests, another one of the service applications 138 may be configured to process payment transaction requests, and another one of the service applications 138 may be configured to process transaction dispute requests. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service applications 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content (e.g., webpages) in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. At least some of the pages (e.g., webpages) served to users are associated with electronic transactions. For example, the interface server 134 may store a log-in page (e.g., log-in webpage) and is configured to serve the log-in page to users for logging into user accounts of the users to access various service provided by the service provider server 130. The interface server 134 may also store a payment page (e.g., a payment webpage) and is configured to serve the payment page to users for conducting electronic payment transactions. As a result, a user may access a user account associated with the user and access various electronic services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In some embodiments, the interface server 134, the account database 136, and the service application 138 are all production components deployed and running in a production hosting platform (e.g., the first hosting platform) of the service provider server 130. Thus, the first hosting platform facilitates real-life transactions between users and the service provider server 130.

In various embodiments, the service provider server 130 includes a platform testing module 132 that implements the platform testing system as discussed herein. In some embodiments, the platform testing module 132 is configured to perform shadow testing on a second hosting platform before migrating the transaction processing systems (which may include the service applications 138) from the first hosting platform to the second hosting platform. As discussed herein, the transaction processing systems, which may include the service applications 138 and the account database 136, may be currently deployed in a production hosting platform (e.g., the first hosting platform). The first hosting platform may be maintained by the online service provider or a third-party entity (e.g., a cloud platform, etc.). The online service provider associated with the service provider server 130 may desire to migrate from the first hosting platform to the second hosting platform, such that the transaction processing systems will be hosted by the second hosting platform, due to one or more reasons such as cost, reliability, scalability, and other reasons.

Figure 2:
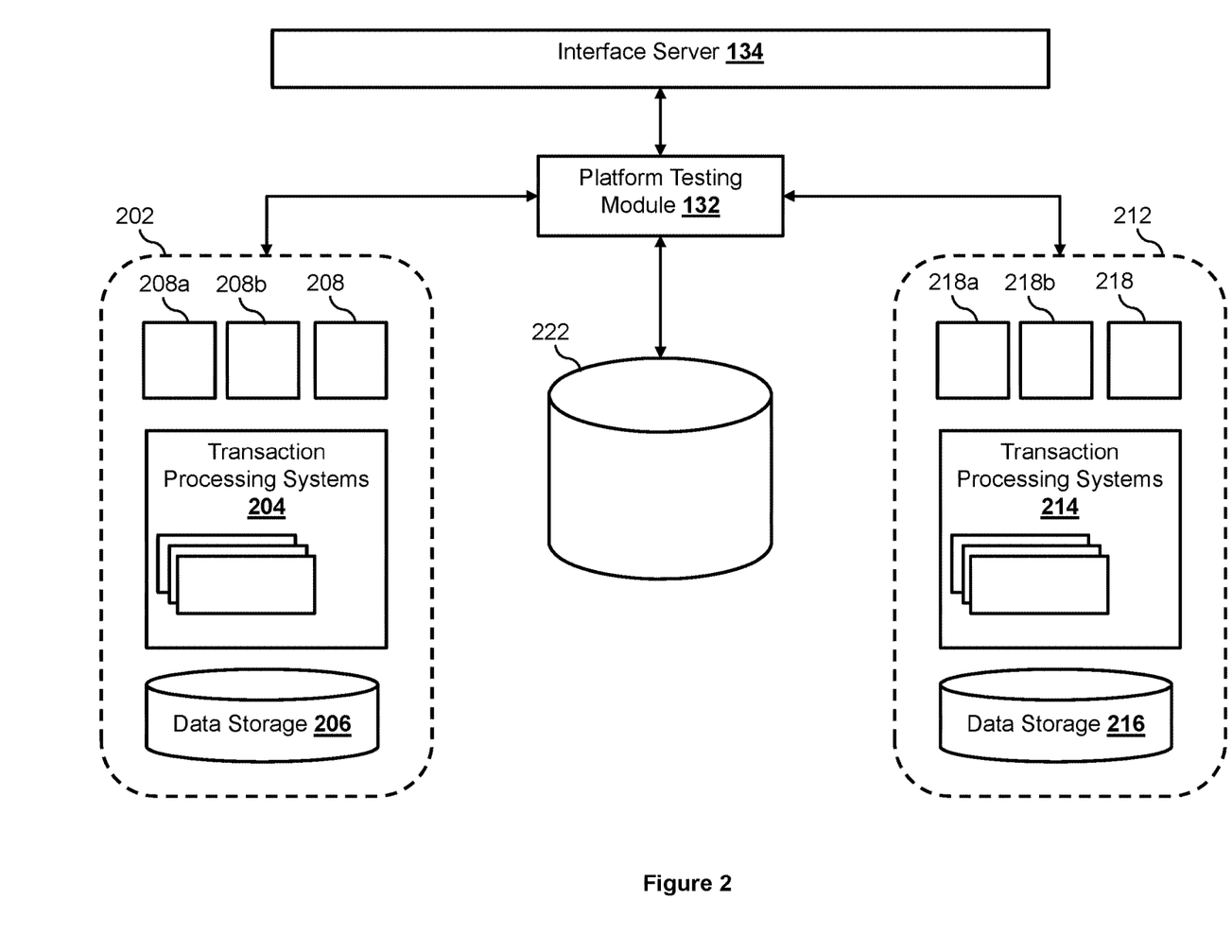
FIG. 2 is a block diagram illustrating different hosting platforms according to an embodiment of the present disclosure.

As shown in FIG. 2, a hosting platform 202 (e.g., the first hosting platform) may include infrastructure for hosting transaction processing systems 204, which may correspond to the software applications 138, the account database 136, and possibly other applications and/or data. The infrastructure of the hosting platform 202 may include the necessary hardware and software that enables the transaction processing systems 204 to provide online services to user devices over the network 160. For example, the infrastructure may include a data storage device 206 for storing and maintaining the account database 136, components 208*a*-208*c* which may include hardware and/or software infrastructure for running the software applications associated with the transaction processing systems, such as one or more computing devices that executes the software applications, an operating system, etc., hardware and/or software infrastructure for providing networking capability for the software applications, such as ports, cables that couple the computing devices to the network, a firewall for protecting the software applications, a web server for serving the webpages to user devices, etc.

For reasons enumerated above, the online service provider may desire to migrate from the hosting platform 202 to another hosting platform 212 (e.g., the second hosting platform). Similar to the hosting platform 202, the hosting platform 212 may also include the necessary hardware and software that enables transaction processing systems to provide online services to user devices over the network 160. For example, the infrastructure may also include a data storage device 216 for storing and maintaining an account database, components 208*a*-208*c* which may include hardware and/or software infrastructure for running the software applications, such as one or more computing devices that executes the software applications, an operating system, etc., hardware and/or software infrastructure for providing networking capability for the software applications, such as ports, cables that couple the computing devices to the network, a firewall for protecting the software applications, a web server for serving the webpages to user devices, etc. The hosting platform 212 may be different from the hosting platform 202 in different aspects. For example, the hosting platforms 202 and 212 may have different types of computing devices (e.g., different brands of servers, different types of hardware processors, different memory types and sizes, different operating systems or versions of operating systems, etc.) for running the transaction processing systems, the hosting platforms 202 and 212 may also have different networking devices (e.g., different networking configurations, different firewall settings, etc.). The hosting platforms 202 and 212 may also include different types of data storage devices (e.g., different types of memory devices, different redundancy settings, different distributed storage settings, etc.). As one skilled in the art would appreciate, the many components in the hosting platforms 202 and 212 that may be different from each other may cause the migration from the hosting platform 202 to the hosting platform 212 challenging. For example, while the transaction processing systems 204 work properly within the hosting platform 202, one or more of the transaction processing systems 204 may not function correctly when they are deployed in the hosting platform 212 due to the differences or due to potential defects within the hosting platform 212. Thus, the platform testing module 132 may be configured to perform shadow testing on the hosting platform 212 to validate one or more functionalities of the hosting platform 212 before the online service provider switch the production platform from the hosting platform 202 to the hosting platform 212.

Figure 3:
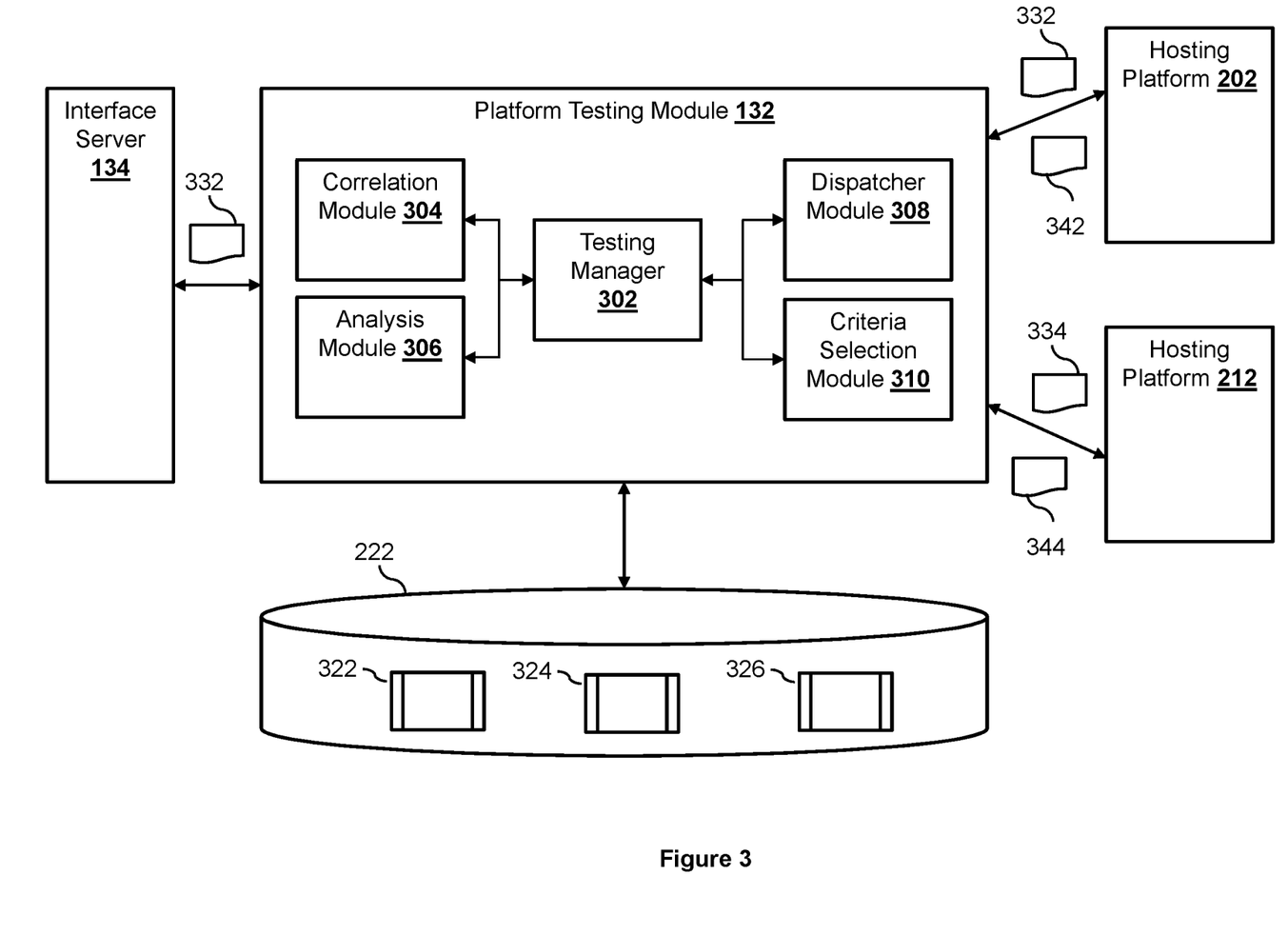
FIG. 3 is a block diagram illustrating a platform testing module according to an embodiment of the present disclosure.

FIG. 3 illustrates a block diagram of the platform testing module 132 according to an embodiment of the disclosure. The platform testing module 132 includes a testing manager 302, a correlation module 304, an analysis module 306, a dispatcher module 308, and a criteria selection module 310. These components, as with others in this figure, may be implemented as stored executable computer instructions in various embodiments. In some embodiments, the testing manager 302 may intercept incoming transaction requests intended for the hosting platform 202. For example, users (e.g., the user 140) and/or merchants may interact with the service provider server 130 using the user device 110 and/or the merchant server 120. Through an interface (e.g., an API or a user interface) provided by the interface server 134, the users and/or merchants may submit transaction requests (e.g., an onboarding request for creating a new account with the service provider server, a payment transaction request for making an electronic payment to another account, a dispute request for disputing a transaction, a request to view information associated with a transaction, etc.) to various transaction processing systems 202 of the service provider server 130 for processing the transaction requests.

In some embodiments, the criteria selection module 310 may determine a set of criteria 324 for comparing responses obtained from the hosting platforms 202 and 212. The set of criteria 324 may set forth which of the attributes are critical (thus, the corresponding attribute values are required to match between two corresponding responses obtained from the hosting platforms 202 and 212), which of the attributes are non-critical (thus, the corresponding attribute values can be different between the two responses), and what are the acceptable differences. The criteria selection module 310 may determine the set of criteria 324 based on inputs provided by various domain experts via a user interface. In some embodiments, the criteria selection module 310 may automatically determine the set of criteria 324 by analyzing historic responses generated from the hosting platforms 202 and 212.

For example, after deploying the transaction processing systems 214 (which corresponds to the transaction processing systems 204) in the hosting platform 212, the platform testing module 132 may begin intercepting incoming transaction requests intended for the transaction processing systems 204 in the hosting platform 202, generating corresponding transaction requests for the transaction processing systems 214 based on the incoming transaction requests, and transmitting the generated transaction requests to the transaction processing systems 214 in the hosting platform 212. In some embodiments, the transaction processing systems 214 may be identical with the transaction processing systems 204, or at least mirror the functionalities of the transaction processing systems 204. The testing manager 302 may receive responses from both the transaction processing systems 204 and the transaction processing systems 214 based on processing the respective transaction requests. In some embodiments, the criteria selection module 310 may determine the set of criteria 324 by comparing corresponding responses received from the transaction processing systems 204 and the transaction processing systems 214.

For example, the criteria selection module 310 may determine that values corresponding to a first set of attributes (e.g., a status of the associated transaction, an Internet Protocol (IP) address of a user device, etc.) consistently match between corresponding responses received from the transaction processing systems 204 and 214 (e.g., values of the first set of attributes match for over a predetermined percentage (e.g., 60%, 80%, 90%, etc.) of responses, etc.). The criteria selection module 310 may also determine that values corresponding to a second set of attributes (e.g., a timestamp, a confirmation number, etc.) are consistently different between corresponding responses received from the transaction processing systems 204 and 214 (e.g., values of the second set of attributes are different for over a predetermined percentage (e.g., 60%, 80%, 90%, etc.) of responses, etc.). In some embodiments, for the attributes that are consistently different such as the second attribute, the criteria selection module 310 may also determine how much those values are different between corresponding responses. For example, the criteria selection module 310 may determine that the values corresponding to the timestamp attribute may deviate from each other no more than a range (e.g., within 2 seconds). However, the criteria selection module 310 may also determine that no patterns exist for the difference in values corresponding to the confirmation number attribute. The criteria selection module 310 may obtain and analyze responses from the transaction processing systems 204 and 214 over a period of time (e.g., an hour, a day, a week, etc.) to determine the set of criteria. Based on analyzing the responses, the criteria selection module 310 may determine the set of criteria to specify that the first set of attributes are critical attributes (e.g., values corresponding to the first set of attributes (e.g., statuses associated transactions, IP addresses of user devices, etc.) must match), that the second set of attributes are non-critical attributes. The set of criteria may further specify that, for the second set of attributes, values corresponding to the confirmation number attribute can be different (or ignored), and that values corresponding to the timestamp attribute can deviate within a predetermined threshold (e.g., 2 seconds). In some embodiments, the set of criteria 324 may be implemented as an exclusion list that provides attributes that can be ignored by the platform testing module 132 when shadow testing the hosting platform 212.

After the set of criteria 324 is determined, the testing manager 302 may begin shadow testing and validating functionalities of the hosting platform 212. The testing manager 302 may intercept incoming transaction requests intended for the transaction processing systems 204 of the hosting platform 202. When the testing manager 302 intercepts an incoming transaction request (e.g., the transaction request 332) intended for one of the transaction processing systems 204, the testing manager 302 may generate a corresponding transaction request (e.g., the transaction request 334) for the transaction processing systems 214 of the hosting platform 212 based on the incoming transaction request 332 and a correlation table 322 stored in the database 222.

In some embodiments, the testing manager 302 may simply duplicate the incoming transaction request 332 to generate the transaction request 334. However, in many instances, simply duplicating the transaction request may lead to incorrect processing of transaction and corruption of data. For instance, when a first incoming transaction request is for creating a new user account with the service provider server 130, the testing manager 302 may copy the first transaction request and transmit the copy of the first transaction request to the hosting platform 212 for processing. While the transaction requests that are transmitted to the hosting platforms 202 and 212 are identical, the result may not be identical. For example, the transaction processing system for creating a user account (e.g., onboarding) running on the two hosting platforms 202 and 212 may use a specific algorithm for generating an account identifier for the user account. The algorithm may be dependent on variables that are different when the first transaction request is being processed by the transaction processing systems running on the different hosting platforms 202 and 212 (e.g., a timestamp, a device ID associated with the computing device running the transaction processing system, etc.). As such, the new account generated by the transaction processing systems running on the two hosting platforms 202 and 212 may have different account identifiers even when they are based on the same transaction request.

In some embodiments, the correlation table 322 indicates a set of attributes (e.g., account identifiers) that require correlations between the hosting platforms 202 and 212. The correlation table 322 may also include, for each of the set of attributes, mappings between attribute values for the hosting platform 202 to attributes values for the hosting platform 212. Thus, when the testing manager 302 receives the two responses having two different account identifiers, the testing manager 302 may determine whether the account identifier attribute is an attribute included in the correlation table 322. If it is determined that the account identifier attribute is included in the correlation table 322, the testing manager 302 may insert the two account identifiers in the correlation table 322, indicating that the two account identifiers correspond to each other, if a mapping between the two account identifiers had not existed in the correlation table 322 already.

When the testing manager 302 intercepts another incoming transaction request (e.g., the transaction request 332) for performing a different process (e.g., making an electronic payment request) for that user account, the testing manager 302 may generate the transaction request 334 for the transaction processing systems 214 of the hosting platform 212 based on the correlation table 322. For example, the transaction request 332 may be associated with a first account identifier. The testing manager 302 may use the correlation module 304 to determine that the first account identifier for the hosting platform 202 corresponds to a second account identifier for the hosting platform 212. Thus, the testing manager 302 may generate the transaction request 334 to include the second account identifier. The testing manager 302 may then use the dispatcher module 308 to transmit the transaction request 332 to the hosting platform 202 and transmit the transaction request 334 to the hosting platform 212.

One of the transaction processing systems 204 deployed within the hosting platform 202 may process the transaction request 322 and may generate a response 342 based on processing the transaction request 322. Similarly, one of the transaction processing systems 214 deployed within the hosting platform 212 may process the transaction request 324 and may generate a response 344 based on processing the transaction request 324. In some embodiments, the testing manager 302 may receive the responses 342 and 344 from one of the transaction processing systems 204 and one of the transaction processing systems 214, respectively. The analysis module 306 may compare the responses 342 and 344 to determine if the difference between the responses 342 and 344 satisfies a set of criteria 324. If it is determined that the difference satisfies the set of criteria 324, the platform testing module 132 may move on and continue performing shadow testing on the hosting platform 212 based on other incoming transaction requests. If it is determined that at least one difference between the responses 342 and 344 (e.g., a mis-match between the attribute values between the responses 342 and 344) does not satisfy the set of criteria, the testing manager 302 may insert the difference in a compare log 326, and may report the compare log 326 to a user via a device of the service provider server 130.

Figure 4:
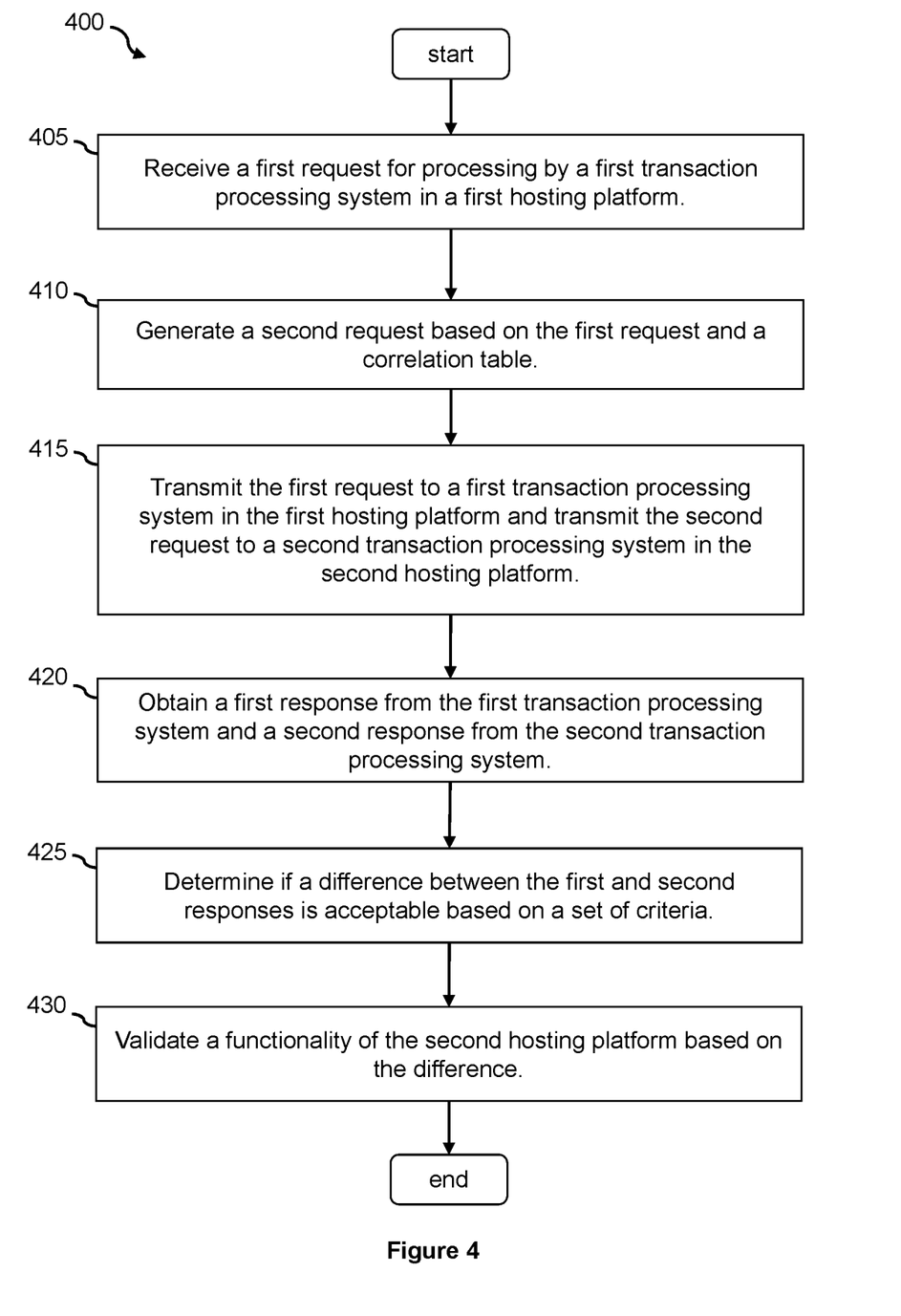
FIG. 4 is a flowchart showing a process of validating a functionality of a hosting platform according to an embodiment of the present disclosure.

FIG. 4 illustrates a process 400 for shadow testing and validating functionalities of a hosting platform according to an embodiment of the disclosure. In some embodiments, all or a portion of the process 400 may be performed by the platform testing module 132, which may be implemented on one or more computer systems. The process 400 begins by receiving (at step 405) a first request for processing by a first transaction processing system in a first hosting platform. For example, the user 140 may use the user device 110 to submit the transaction request 332 to the service provider server 130 via the interface server 134 (e.g., via a webpage interface). The interface server 134 may transmit the transaction request 332 to the transaction processing systems 204 of the hosting platform 202 for processing the transaction request 332. The testing manager 302 may intercept the incoming transaction request 332 intended for the transaction processing systems 204 of the hosting platform 202.

The process 400 then generates (at step 410) a second request based on the first request and a correlation table. For example, the incoming transaction request 332 may be associated with a first account identifier. The testing manager 302 may use the correlation module 304 to determine that the first account identifier corresponds to a second account identifier for the hosting platform 212. Thus, the testing manager 302 may generate the transaction request 334 by duplicating the transaction request 332 and replacing the first account identifier with the second account identifier. When the incoming transaction request 332 does not include any data that appears in the correlation table, the testing manager 302 may generate the transaction request 334 by simply duplicating the transaction request 332.

The process 400 then transmits (at step 415) the first request to a first transaction processing system in the first hosting platform and transmits the second request to a second transaction processing system in the second hosting platform. For example, the dispatching module 308 may transmit the transaction request 332 to the transaction processing systems 204 of the hosting platform 202 and may transmit the transaction request 334 to the transaction processing systems 214 of the hosting platform 212.

At step 420, the process 400 obtains a first response from the first transaction processing system and a second response from the second transaction processing system. After receiving the transaction request 332 from the dispatching module 308, one or more of the transaction processing systems 204 may process the transaction request 332. For example, when the transaction request 332 is an onboarding request for creating a new account with the service provider server 130, the one or more of the transaction processing systems 204 may create a new user account by assigning a new account identifier to the new user account and updating a database (e.g., the accounts database 136) in the data storage 206. In another example, when the transaction request 332 is a payment request for performing an electronic payment to another user account, the one or more of the transaction processing systems 204 may process the payment transaction (e.g., by using the service applications 138), and update transaction data and account data in the accounts database 136 in the data storage 206.

After processing the transaction request 332, the one or more of the transaction processing systems 204 may then generate a response 342 for the transaction request 332. The response 342 may indicate a status of the transaction (e.g., success or fail, approved or denied, etc.) and other information such as a timestamp indicating a time of processing the transaction request 332 or an account identifier (e.g., the new account identifier generated for the new account, etc.). The one or more of the transaction processing systems 204 may transmit the response 342 to the interface server 134, such that the interface server 134 may provide a response to the user device 110. In some embodiments, the testing manager 302 may intercept the response 342 intended for the interface server 134.

Similarly, after receiving the transaction request 334 from the dispatching module 308, one or more of the transaction processing systems 214 may process the transaction request 334. For example, when the transaction request 334 is an onboarding request for creating a new account with the service provider server 130, the one or more of the transaction processing systems 214 may create a new user account by assigning a new account identifier to the new user account and updating a database (e.g., a copy of the accounts database 136) in the data storage 216. In another example, when the transaction request 334 is a payment request for performing an electronic payment to another user account, the one or more of the transaction processing systems 214 may process the payment transaction, and update transaction data and account data in the accounts database stored in the data storage 216.

After processing the transaction request 334, the one or more of the transaction processing systems 214 may then generate a response 344 for the transaction request 334. The response 344 may indicate a status of the transaction (e.g., success or fail, approved or denied, etc.) and other information such as a timestamp indicating a time of processing the transaction request 334 or an account identifier (e.g., the new account identifier generated for the new account, etc.). The one or more of the transaction processing systems 214 may transmit the response 344 to the testing manager 302.

The process 400 then determines (at step 425) if a difference between the first and second responses is acceptable based on a set of criteria and validates (at step 430) a functionality of the second hosting platform based on the difference. For example, after receiving the responses 342 and 344 from the transaction processing systems 202 and 212, respectively, the testing manager 302 may use the analysis module 306 to compare the responses 342 and 344. In some embodiments, the analysis module 306 may determine a difference between the responses 342 and 344 and determine whether the difference satisfies the set of criteria 324. As discussed above, each of the responses 342 and 344 may include one or more values corresponding to one or more attributes (e.g., a status of the transaction, an account identifier, a timestamp, etc.). In some embodiments, the analysis module 306 may compare each pair of values from the two responses 342 and 344 corresponding to the same attribute to determine whether the values match. For example, the analysis module 306 may determine whether the statuses indicated in the responses 342 and 344 match.

If the statuses from the responses 342 and 344 match, the analysis module 306 may move on to another pair of values.

In one example, the analysis module 306 may determine that the values corresponding to an attribute (e.g., an account identifier attribute, a timestamp attribute, etc.) indicated in the responses 342 and 344 do not match. In some embodiments, the analysis module 306 may access the set of criteria 324 to determine whether the attribute is a non-critical attribute (e.g., on an exclusion list of the set of criteria) and/or whether the difference is within an acceptable range of difference. If it is determined that the attribute is a non-critical attribute (e.g., on the exclusion list) and that the difference is within the acceptable range of difference, the analysis module 306 may determine that the difference in the attribute (e.g., the account identifiers) is acceptable. The analysis module 306 may continue to analyze all of the values within the responses 342 and 344 until it determines that all differences in the values between the responses 342 and 344 are acceptable.

Once the response 344 is validated by the analysis module 306, the testing manager 302 may continue to shadow test the hosting platform 212 by intercepting incoming transaction requests, generating corresponding transaction requests for the hosting platform 212, and comparing the responses from the hosting platforms 202 and 212 over a period of time (e.g., 5 hours, 1 day, 30 days, etc.). In some embodiments, the testing manager 302 may validate one or more functionalities of the hosting platform 212 based on successfully validating responses from the hosting platform 212 associated with the one or more functionalities. For example, the testing manager may validate a first functionality (e.g., electronic payment transaction) of the hosting platform 212 when the number of transaction requests associated with the first functionality (e.g., electronic payment transaction requests) has been shadow tested on the hosting platform 212, where all of the responses from the hosting platform 212 satisfies the set of criteria. In some embodiments, the platform testing system may generate a report indicating which of the functionalities that have been validated through the shadow testing and may provide the report to a device associated with the online service provider.

If, during the shadow testing, the analysis module 306 determines that a response from the hosting platform 212 is not validated (e.g., values of a critical attribute between the responses 342 and 344 do not match, and the attribute is not on the exclusion list (e.g., the status attribute, etc.) or that the difference is outside the acceptable range of difference), the analysis module 306 may determine that the difference is unacceptable, and may determine a defect exists within the hosting platform 212. The testing manager 302 may insert the difference in the compare log file 326 and may report the log file 326 to a user of the service provider server 130.

By automatically determining the set of criteria for comparing responses during shadow testing of the new hosting platform (e.g., the hosting platform 212), the platform testing module 132 may validate one or more functionalities of the hosting platform 212 (or determining defects of the hosting platform 212) automatically without requiring inputs from domain experts from different domains.

Figure 5:
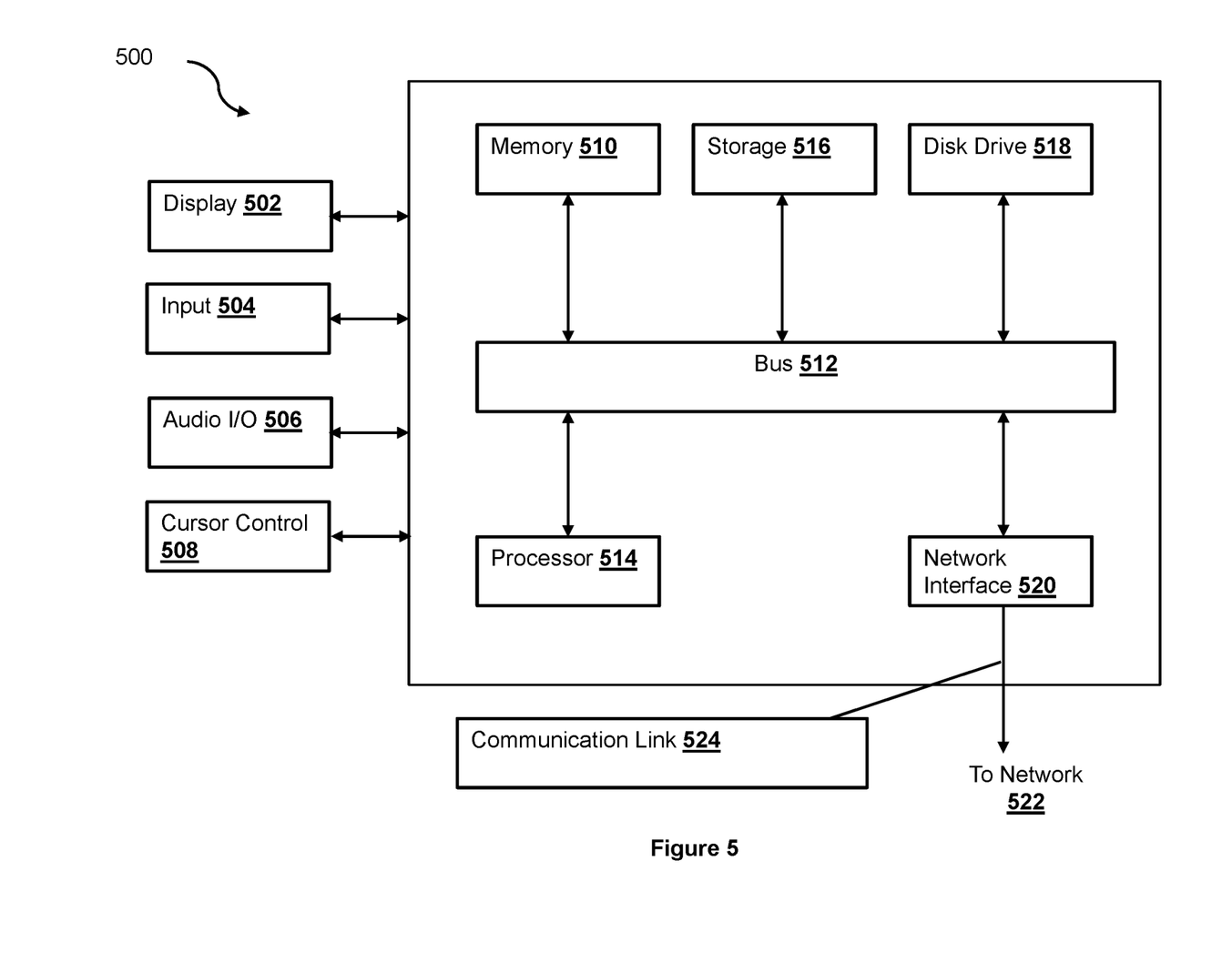
FIG. 5 is a block diagram of a system for implementing a device according to an embodiment of the present disclosure.

FIG. 5 is a block diagram of a computer system 500 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 500 in a manner as follows.

The computer system 500 includes a bus 512 or other communication mechanism for communicating information data, signals, and information between various components of the computer system 500. The components include an input/output (I/O) component 504 that processes a user (i.e., sender, recipient, service provider) action, such as selecting keys from a keypad/keyboard, selecting one or more buttons or links, etc., and sends a corresponding signal to the bus 512. The I/O component 504 may also include an output component, such as a display 502 and a cursor control 508 (such as a keyboard, keypad, mouse, etc.). The display 502 may be configured to present a login page for logging into a user account or a checkout page for purchasing an item from a merchant. An optional audio input/output component 506 may also be included to allow a user to use voice for inputting information by converting audio signals. The audio I/O component 506 may allow the user to hear audio. A transceiver or network interface 520 transmits and receives signals between the computer system 500 and other devices, such as another user device, a merchant server, or a service provider server via network 522. In one embodiment, the transmission is wireless, although other transmission mediums and methods may also be suitable. A processor 514, which can be a micro-controller, digital signal processor (DSP), or other processing component, processes these various signals, such as for display on the computer system 500 or transmission to other devices via a communication link 524. The processor 514 may also control transmission of information, such as cookies or IP addresses, to other devices.

The components of the computer system 500 also include a system memory component 510 (e.g., RAM), a static storage component 516 (e.g., ROM), and/or a disk drive 518 (e.g., a solid-state drive, a hard drive). The computer system 500 performs specific operations by the processor 514 and other components by executing one or more sequences of instructions contained in the system memory component 510. For example, the processor 514 can perform the hosting platform testing functionalities described herein according to the process 400.

Logic may be encoded in a computer readable medium, which may refer to any medium that participates in providing instructions to the processor 514 for execution. Such a medium may take many forms, including but not limited to, non-volatile media, volatile media, and transmission media. In various implementations, non-volatile media includes optical or magnetic disks, volatile media includes dynamic memory, such as the system memory component 510, and transmission media includes coaxial cables, copper wire, and fiber optics, including wires that comprise the bus 512. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 500. In various other embodiments of the present disclosure, a plurality of computer systems 500 coupled by the communication link 524 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A platform testing system usable for migrating functionalities of a first hosting platform associated with a service provider to a second hosting platform associated with the service provider, wherein the first hosting platform is configured to provide transaction services to user computing devices in a plurality of domains via an electronic communication network, wherein each domain in the plurality of domains is associated with a distinct online service provided by a distinct application of the first hosting platform, wherein the platform testing system is configured to test and validate the functionalities in the second hosting platform by shadow testing the second hosting platform across the plurality of domains over a period of time, and wherein the platform testing system comprises:

a non-transitory memory; and
one or more hardware processors coupled with the non-transitory memory and configured to read instructions from the non-transitory memory to cause the platform testing system to perform operations comprising:
monitoring, by a platform testing module of the platform testing system, responses from the first and second hosting platforms during processing transaction requests across the plurality of domains;
determining, based on the responses from the first and second hosting platforms, a set of validation criteria for validating the functionalities in the second hosting platform across the plurality of domains, wherein the set of validation criteria comprises critical validation criteria and non-critical validation criteria;
storing the set of validation criteria in a data storage;
providing, by a platform testing module of the platform testing system, a user interface that enables designated users with domain knowledge to modify the set of validation criteria;
generating, by the platform testing module, a correlation table for modifying transaction requests for the second hosting platform based at least in part on the modified set of validation criteria and the responses from the first and second hosting platforms, wherein the correlation table comprises a mapping between first request attribute values associated with the first hosting platform and second request attribute values associated with the second hosting platform;
storing the correlation table in the data storage;
intercepting, by the platform testing module, a first transaction request associated with a first domain in the plurality of domains and intended for the first hosting platform;
determining, by the platform testing module and based on the correlation table, whether a modification to the first transaction request is required to test a functionality associated with the first transaction request in the second hosting platform;
in response to determining that the modification to the first transaction request is required, generating, by the platform testing module, a second transaction request based on the first transaction request and the correlation table, wherein the generating the second transaction request comprises modifying the first transaction request based on a record in the correlation table;
transmitting the first transaction request to the first hosting platform;
transmitting the second transaction request to the second hosting platform;
receiving, from the first hosting platform, a first response for the first transaction request;
receiving, from the second hosting platform, a second response for the second transaction request;
determining a difference between the first response and the second response;
determining whether the difference satisfies a first subset of the set of validation criteria corresponding to the first domain;
reporting, on a user computing device, information indicating the difference; and
determining whether to validate the functionality of the second hosting platform based on the determining whether the difference satisfies the first subset of the set of validation criteria, wherein the platform testing module is configured to continue validating the functionalities across the plurality of domains in the second hosting platform based on the shadow testing of the second hosting platform over the period of time.

2. The platform testing system of claim 1, wherein the second hosting platform mirrors the functionalities of the first hosting platform.

3. The platform testing system of claim 1, wherein the operations further comprise:
obtaining a first plurality of responses corresponding to a first plurality of transaction requests processed by the first hosting platform;
obtaining a second plurality of responses corresponding to a second plurality of transaction requests processed by the second hosting platform; and
comparing the first plurality of responses against the second plurality of responses, wherein the correlation table is generated further based on the comparing.

4. The platform testing system of claim 3, wherein the operations further comprise:
determining that values corresponding to a first attribute between at least a portion of the first and second pluralities of responses are different;
determining that the portion exceeds a predetermined threshold; and
in response to determining that the portion exceeds the predetermined threshold, designating the first attribute as a first attribute type in the correlation table.

5. The platform testing system of claim 1, wherein each of the first response and the second response comprises values corresponding to a set of attributes, and wherein the operations further comprise:
determining one or more attributes associated with a second attribute type from the set of attributes based on the correlation table; and
determining whether a first subset of values from the first response corresponding to the one or more attributes matches a second subset of values from the second response corresponding to the one or more attributes, wherein the difference is determined to satisfy the first subset of the set of validation criteria when the first subset of values matches the second subset of values.

6. The platform testing system of claim 1, wherein the first hosting platform comprises a first data storage device storing account data associated with a plurality of users, and wherein the operations further comprise:
copying the account data from the first data storage device to a second data storage device in the second hosting platform.

7. The platform testing system of claim 1, wherein the first hosting platform comprises a first network-enabled application hosting server, and wherein the second hosting platform comprises a second network-enabled application hosting server different from the first network-enabled application hosting server.

8. The platform testing system of claim 1, wherein the first hosting platform comprises a first set of servers and hardware networking equipment hosted by a first entity, and wherein the second hosting platform comprises a second set of servers and hardware networking equipment hosted by a second entity.

9. A method for migrating functionalities of a first hosting platform associated with a service provider to a second hosting platform associated with the service provider, wherein the first hosting platform is configured to provide transaction services to user computing devices in a plurality of domains via an electronic communication network, wherein each domain in the plurality of domains is associated with a distinct online service provided by a distinct application of the first hosting platform, wherein a platform testing system is configured to test and validate the functionalities in the second hosting platform by shadow testing the second hosting platform across the plurality of domains over a period of time, and wherein the method comprises:

monitoring, by one or more hardware processors associated with the platform testing system, responses from the first and second hosting platforms during processing transaction requests across the plurality of domains;

determining, by the one or more hardware processors and based on the responses from the first and second hosting platforms, a set of validation criteria for validating the functionalities in the second hosting platform across the plurality of domains, wherein the set of validation criteria comprises at least one critical validation criterion and at least one non-critical validation criterion;

storing the set of validation criteria in a data storage;

providing, by the one or more hardware processors associated with the platform testing system, a user interface that enables designated users with domain knowledge to modify the set of validation criteria;

generating, by the one or more hardware processors, a correlation table for modifying transaction requests for the second hosting platform based on the modified set of validation criteria and the past responses generated by the first and second hosting platforms, wherein the correlation table comprises a mapping between first request attribute values associated with the first hosting platform and second request attribute values associated with the second hosting platform;

storing the correlation table in the data storage;

intercepting, by the one or more hardware processors, a first transaction request associated with a first domain in the plurality of domains and intended for the first hosting platform;

determining, based on the correlation table, whether a modification to the first transaction request is required to test a functionality associated with the first transaction request in the second hosting platform;

in response to determining that the modification to the first transaction request is required, generating, by the one or more hardware processors, a second transaction request based on the first transaction request and the correlation table, wherein the generating the second transaction request comprises modifying the first transaction request based on a record in the correlation table;

transmitting the first transaction request to the first hosting platform;

transmitting the second transaction request to the second hosting platform;

receiving, from the first transaction processing system, a first response for the first transaction request;

receiving, from the second transaction processing system, a second response for the second transaction request;

comparing the first response against the second response;

determining whether the second response satisfies a subset of the set of validation criteria corresponding to the first domain;

reporting, on a user computing device, data indicating a result of the comparing; and determining whether to validate the functionality of the second hosting platform based on the result of the comparing, wherein the platform testing system is configured to continue validating the functionalities across the plurality of domains in the second hosting platform based on the shadow testing of the second hosting platform over the period of time.

10. The method of claim 9, further comprising deploying the second hosting platform.

11. The method of claim 9, further comprising:
determining that a difference between a first value in the first response and a second value in the second response does not exceed a threshold; and
storing a correlation between the first value and the second value in the correlation table.

12. The method of claim 11, further comprising:
receiving a request to analyze a transaction associated with the first value;
retrieving information associated with the processing of the second transaction request by the second transaction processing system based on the correlation between the first value and the second value; and
providing the information to a second user computing device.

13. The method of claim 9, further comprising:
determining that a difference between a first value in the first response and a second value in the second response fails to satisfy the subset of the set of validation criteria; and
determining a defect of the second hosting platform based on the difference.

14. The method of claim 9, further comprising:
obtaining a first plurality of responses corresponding to a first plurality of transaction requests processed by the first transaction processing system;
obtaining a second plurality of responses corresponding to a second plurality of transaction requests processed by the second transaction processing system; and
comparing the first plurality of responses against the second plurality of responses, wherein the correlation table is generated further based on the comparing the first plurality of responses against the second plurality of responses.

15. A non-transitory machine-readable medium having stored thereon machine-readable instructions usable for migrating functionalities of a first hosting platform associated with a service provider to a second hosting platform associated with the service provider, wherein the first hosting platform is configured to provide transaction services to user computing devices in a plurality of domains via an electronic communication network, wherein each domain in the plurality of domains is associated with a distinct online service provided by a distinct application of the first hosting platform, wherein a platform testing system is configured to test and validate the functionalities in the second hosting platform by shadow testing the second hosting platform across the plurality of domains over a period of time, and wherein the machine-readable instructions are executable to cause a machine associated with the platform testing system to perform operations comprising:

monitoring responses from the first and second hosting platforms during processing transaction requests across the plurality of domains;

determining, based on the responses from the first and second hosting platforms, a set of validation criteria for validating the functionalities in the second hosting platform across the plurality of domains, wherein the set of validation criteria comprises a critical validation criterion and a non-critical validation criterion;

storing the modified set of validation criteria in a data storage;

providing a user interface that enables designated users with domain knowledge to modify the set of validation criteria;
generating a correlation table for modifying transaction requests for the second hosting platform based on the modified set of validation criteria and the past responses generated by the first and second hosting platforms, wherein the correlation table comprises a mapping between first request attribute values associated with the first hosting platform and second request attribute values associated with the second hosting platform;
storing the correlation table in the data storage;
intercepting a first transaction request intended for the first hosting platform, wherein the first transaction request is associated with a first domain of the plurality of domains;
determining, based on the correlation table, whether a modification to the first transaction request is required to test a functionality associated with the first transaction request in the second hosting platform;
in response to determining that the modification to the first transaction request is required, generating a second transaction request based on the first transaction request and the correlation table, wherein the generating the second transaction request comprises modifying the first transaction request based on the correlation table;
transmitting the first transaction request to the first hosting platform;
transmitting the second transaction request to the second hosting platform;
receiving, from the first hosting platform, a first response for the first transaction request;
receiving, from the second hosting platform, a second response for the second transaction request;
determining a difference between the first response and the second response;
determining whether the difference satisfies a first subset of the set of validation criteria corresponding to the first domain;
reporting, on a user computing device, information indicating the difference; and
determining whether to validate the functionality of the second hosting platform based on the determining whether the difference satisfies the first subset of the set of validation criteria, wherein the platform testing system is configured to continue validating the functionalities across the plurality of domains in the second hosting platform based on the shadow testing of the second hosting platform over the period of time.

16. The non-transitory machine-readable medium of claim 15, wherein the second hosting platform mirrors the functionalities of the first hosting platform.

17. The non-transitory machine-readable medium of claim 15, wherein the operations further comprise:
obtaining a first plurality of responses corresponding to a first plurality of transaction requests processed by the first transaction processing system;
obtaining a second plurality of responses corresponding to a second plurality of transaction requests processed by the second transaction processing system; and
comparing the first plurality of responses against the second plurality of responses, wherein the correlation table is generated further based on the comparing.

18. The non-transitory machine-readable medium of claim 17, wherein the operations further comprise:
determining that values corresponding to a first attribute between at least a portion of the first and second pluralities of responses are different;
determining that the portion exceeds a predetermined threshold; and
in response to determining that the portion exceeds the predetermined threshold, designating the first attribute as a second attribute type in the correlation table.

19. The non-transitory machine-readable medium of claim 15, wherein each of the first response and the second response comprises values corresponding to a set of attributes, and wherein the operations further comprise:
determining one or more attributes associated with the first attribute type from the set of attributes based on the correlation table; and
determining whether a first subset of values from the first response corresponding to the one or more attributes matches a second subset of values from the second response corresponding to the one or more attributes, wherein the determining whether to validate the functionality of the second hosting platform is further based on determining whether the first subset of values matches the second subset of values.

20. The non-transitory machine-readable medium of claim 15, wherein the first hosting platform comprises a first data storage device storing account data associated with a plurality of users, and wherein the operations further comprise:
copying the account data from the first data storage device to a second data storage device in the second hosting platform.

* * * * *